UNITED STATES PATENT OFFICE 2,220,855

UNSATURATED ESTERS OF FUMARIC ACID

Harold R. Slagh, Midland, Mich., assignor to The Dow Chemical Company, Midland, Mich., a corporation of Michigan No Drawing. Original application September 30, 1937, Serial No. 166,591. Divided and this application May 19, 1938, Serial No. 208,861

2 Claims. (Cl. 260—485)

The present invention relates to certain new esters of fumaric acid having the general formula:

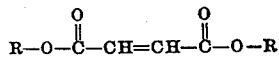

wherein R represents an aliphatic hydrocarbon radical containing at least one ethylenic linkage and not more than 10 carbon atoms. These new compounds are all practically colorless mobile liquids with moderately high boiling points. They are particularly useful in the preparation of new resinous materials and as modifying agents in the polymerization of vinyl compounds, particularly styrene.

The present application is a division of my co-pending application Serial No. 166,591, filed September 30, 1937.

The new esters may be prepared by reacting fumaric acid with an aliphatic alcohol containing at least one ethylenic linkage and not more than 10 carbon atoms. The reaction is preferably carried out using approximately one mol of fumaric acid, 2 to 5 mols of the alcohol, and a small proportion, e. g. 0.01 to 0.1 mol, of a mineral acid as catalyst, although other proportions may be used. The agents are mixed and heated at a moderate temperature, e. g. 40° to 150° C., for a period of from about 4 to 20 hours. Excess alcohol is then distilled from the mixture after which the residue is neutralized and fractionally distilled at reduced pressure to separate the ester product.

In preparing fumaric acid esters by the method just described, I have found that the yield may be improved by adding to the esterification mixture a water-immiscible liquid which forms an azeotropic mixture with water. As the reaction proceeds this azeotrope may be boiled off, thus removing the water formed during esterification and allowing the reaction to proceed more nearly to completion. Methylene dichloride and chlorobenzene have been found particularly suitable for this purpose.

The new esters may also be prepared by reacting a heavy metal salt, e. g. a lead or silver salt, of fumaric acid with an unsaturated aliphatic mono-halide containing not more than 10 carbon atoms per molecule. According to the preferred procedure, a mixture of one mol of the salt and an excess, e. g. 2 to 5 mols, of the halide is heated in a closed container for several hours at a temperature of 100° to 200° C. The reaction mixture is then cooled, washed with water, and filtered, and the filtrate is fractionally distilled at reduced pressure to separate the desired ester. This method may be applied in preparing any of my ester products and is particularly advantageous for the preparation of the dimethallyl esters, which, peculiarly, are obtained in very low yield if at all when operating according to the other methods hereinbefore mentioned.

As also stated above, my new esters are particularly useful in the production of synthetic resins as described in my co-pending application Serial No. 198,495, filed March 28, 1938. For this use they are much superior to the corresponding esters of maleic acid known in the prior art. For instance, as shown in Example 2, diallyl fumarate polymerizes several times more rapidly than diallyl maleate. Such difference in rate is especially important when fabricating resinous products, since use of the rapidly polymerizable fumaric acid esters results in a considerable saving of time and money to the manufacturer.

The following examples illustrate various ways in which the principle of the invention has been employed, but are not to be construed as limiting the scope thereof:

Example 1

A mixture of 580 grams of fumaric acid, 870 grams of allyl alcohol, 5 grams of concentrated sulphuric acid and 1750 grams of methylene dichloride was heated for 44 hours at a temperature between about 48° C. and about 69° C. During this time the methylene dichloride-water azeotrope distilled slowly from the mixture and was condensed, the water being separated and the methylene dichloride returned continuously to the reaction. In all, 172 grams of water was thus removed. When reaction was complete, 6 grams of sodium carbonate was added to the mixture and the latter was then fractionally distilled at reduced pressure, the fraction distilling at temperatures between 114° C. at 0.13 inch and 110° C. at 0.1 inch absolute pressure being collected. This fraction consisted of 859 grams of diallyl fumarate, the formula of which is:

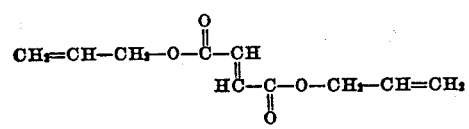

a colorless mobile liquid of slightly penetrating odor having a boiling point of about 110° C. at 0.1 inch absolute pressure and a specific gravity of about 1.055 at 33°—33° C.

Example 2

Samples of pure diallyl maleate and pure diallyl fumarate were heated at 80° C. for 18 hours. Each sample was then extracted with benzene to dissolve the portion of the ester remaining unpolymerized, and the insoluble polymerized portion was dried and weighed. The diallyl maleate samples were found to have polymerized to an extent of 4.7 per cent by weight, and the diallyl fumarate to 19.4 per cent.

Other fumaric acid esters having the general formula hereinbefore presented may also be prepared by methods described in the foregoing paragraphs, e. g. di-methallyl fumarate, di-crotyl fumarate, the fumaric acid di-ester of allyl isopropyl carbinol, di-(octen-2-yl-8)fumarate, di-citronellyl fumarate, etc. Such compounds are usually high boiling, colorless, mobile liquids.

Other modes of applying the principle of the invention may be employed, change being made as regards the details hereinbefore disclosed, provided the products stated by any of the following claims or the equivalent of such stated products be employed.

I therefore particularly point out and distinctly claim as my invention:

1. A fumaric acid ester having the general formula:

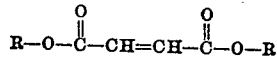

wherein R represents an aliphatic hydrocarbon radical containing at least one ethylenic linkage and not more than 10 carbon atoms.

2. Diallyl fumarate, a colorless mobile liquid having a boiling point of about 110° at 0.1 inch absolute pressure, and a specific gravity of about 1.055 at 33°—33° C.

HAROLD R. SLAGH.

DISCLAIMER 2,220,855.—*Harold R. Slagh*, Midland, Mich. UNSATURATED ESTERS OF FUMARIC ACID. Patent dated November 5, 1940. Disclaimer filed December 26, 1941, by the assignee, *The Dow Chemical Company*.

Hereby disclaims from the scope of claim 1 of the above identified patent the substance defined by claim 2, and disclaims claim 2.

[*Official Gazette January 27, 1942.*]